United States Patent

Huang

Patent Number: 5,473,395
Date of Patent: Dec. 5, 1995

[54] FOLDABLE ELASTIC TEMPLE FOR SPECTACLES

[76] Inventor: Chun-Chu Huang, 12, Lane 124, Chung-Sun Road, Jen-Te Shiang, Tainan Hsien, Taiwan

[21] Appl. No.: 279,015

[22] Filed: Jul. 22, 1994

[51] Int. Cl.$^6$ .............................. G02C 5/14; G02C 5/22
[52] U.S. Cl. ........................ 351/113; 351/63; 351/119; 351/121; 16/228
[58] Field of Search ............................ 351/114, 119, 351/63, 111, 113, 121, 140; 16/228

[56] References Cited

U.S. PATENT DOCUMENTS

| 4,834,523 | 5/1989 | Porsche | 351/63 X |
| 5,018,242 | 5/1991 | Guy et al. | 16/228 |
| 5,165,060 | 11/1992 | Huang | 351/113 |
| 5,231,429 | 7/1993 | Kanda | 351/119 X |

FOREIGN PATENT DOCUMENTS

| 2641382 | 7/1990 | France | 16/228 |
| 2268282 | 1/1994 | United Kingdom | 16/228 |

Primary Examiner—William L. Sikes
Assistant Examiner—David R. Parsons

[57] ABSTRACT

A foldable elastic temple for spectacles having a front half temple elastically combined with a lens frame by means of an elastic assembly consisting of a connector, a socket, a spring and a bolt, the elastic assembly fitted in a front chamber provided in a front end portion of the front temple to provide the front half temple with elasticity to be stretched outward for wearing on any size of a face, and a rear half temple combined pivotally with the front half temple to allow the front half temple folded on the rear half temple for minimizing the length of the temple in putting away.

2 Claims, 7 Drawing Sheets

5,473,395

FOLDABLE ELASTIC TEMPLE FOR SPECTACLES

BACKGROUND OF THE INVENTION

This invention concerns a foldable elastic temple for spectacles, particularly directed to one possible to be stretched elastically outward and to be folded in a half length.

A known conventional elastic temple for spectacles shown in FIGS. 1 and 2 comprises a connector 10 fitted in a square socket 11, a coil spring 13 having its front end urging the front end of the socket 11 and its rear end urging a head 120 of a bolt 12 extending through the coil spring 13 and through the socket 11 to have its male-threaded end engaging with a female-threaded hole 100 in the connector 10. The elastic assembly of the connector 10, the socket 11, the bolt 12 and the spring 13 is then inserted in a chamber 140 in a front end of a temple 14 and adhered and secured therein with glue injected through a sidewise hole 141 in a side wall of the chamber 140. Then the front portion with a hole of the connector 10 is combined with two projections A1 by means of a screw N. Therefore, the elastic assembly gives an elasticity to the temple.

But this kind of conventional elastic temple has disadvantages as follows.

1. The socket 11 often separates from the temple 14, because the adhesive loses its function owing to a long period of use.

2. The temple is not foldable, too long to be stored.

SUMMARY OF THE INVENTION

An object of this invention is to offer a kind of temple having the socket directly secured in the chamber of the temple, without use of adhesive.

Another object of this invention is to offer a kind of temple possible to be elastically stretched outward enough to be worn on any size of a face and to be folded in a half length for convenience of storing.

A feature of the present invention is provision of the socket additionally provided with a sidewise projection having an inclined upper surface on a side to fit in a side hole of the chamber of the temple for securing the socket in the chamber stably without need of adhesive after the socket is inserted therein.

Another feature of the present invention is the temple consisting of a front half and a rear half to pivotally combined together, possible to be folded to become a half length for putting away.

DETAILED DESCRIPTION OF THE INVENTION

Figure 1:
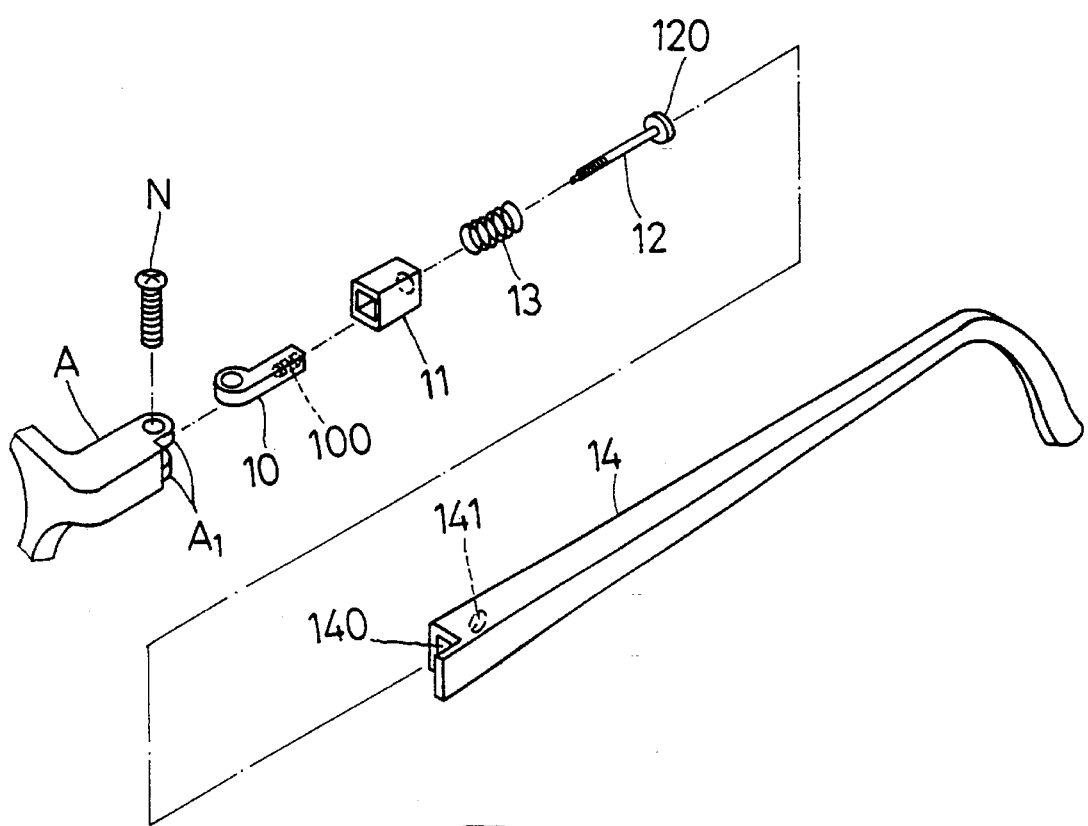
FIG. 1 is an exploded perspective view of a conventional elastic temple for spectacles.
Figure 2:
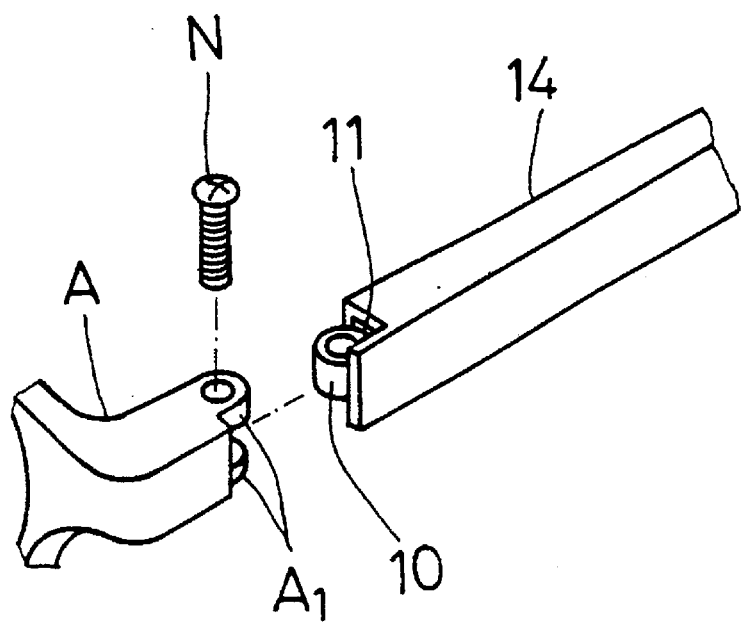
FIG. 2 is a perspective view of a conventional elastic temple, showing its-connecting portions.
Figure 3:
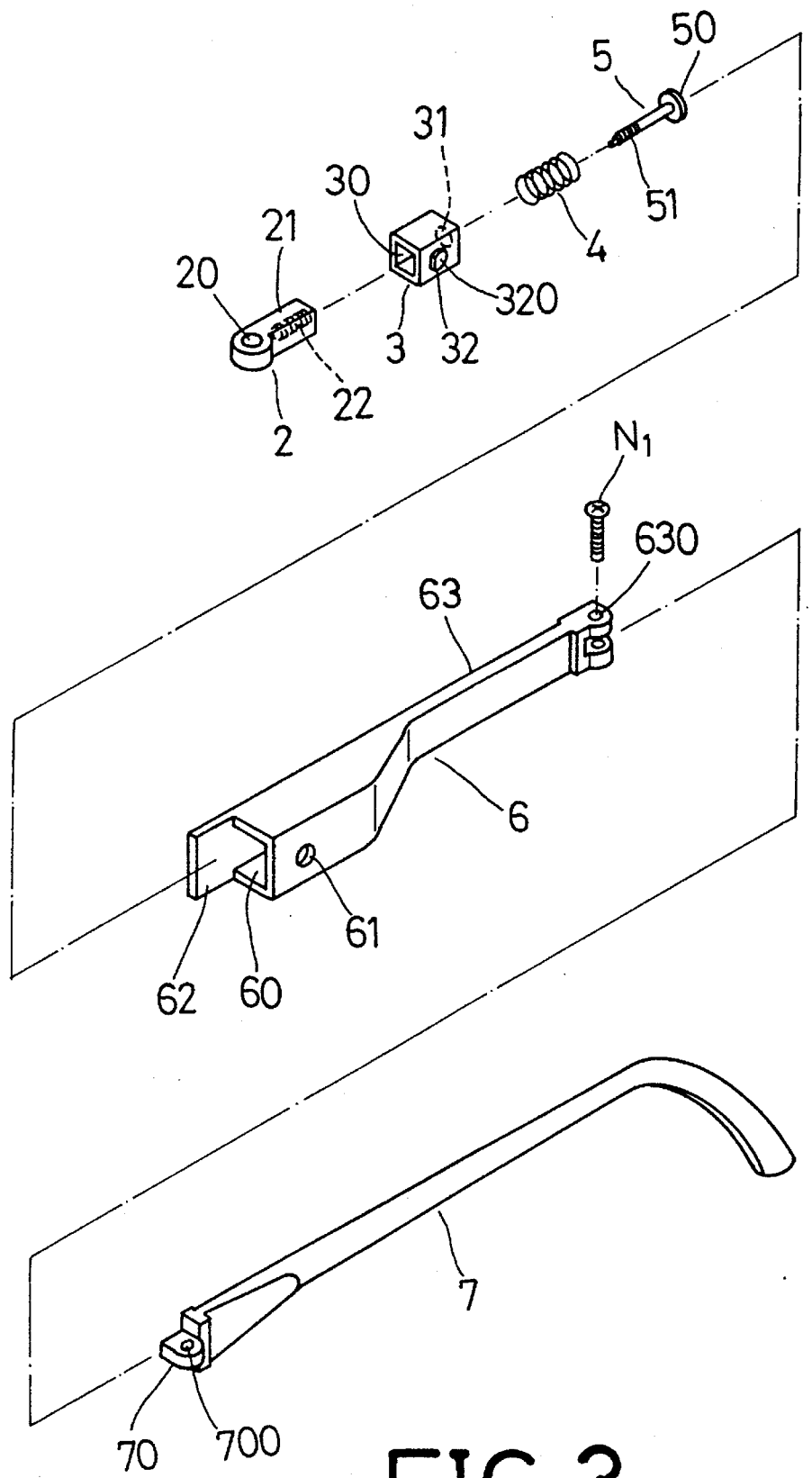
FIG. 3 is an exploded perspective view of a foldable elastic temple for spectacles in the present invention.

A temple for spectacles in the present invention, as shown in FIG. 3, comprises a connector 2, a socket 3, a coil spring 4, a bolt 5, a front half temple 6 and a rear half temple 7 combined together.

The connector 2 has a front round portion 20 with a screw hole 20 and a rectangular rear portion 21 provided with a lengthwise female-threaded hole 22 in its end portion for the bolt 5 to engage with.

The socket 3 is shaped as square, having a square hole 30 in a front portion and a round hole 31 in a rear portion communicating with the square hole 30, a sidewise projection 32 on a right side having an upper inclined surface 320. The square hole 30 fits with the rear portion 21 of the connector 2.

The coil spring 4 has its front end urging a rear end of the socket 3 and its rear end urging a head 50 of the bolt 5.

The bolt 5 has a large head 50 and a lower male-threaded portion 51, fitting through the spring 4 and the socket 2, with the male-threaded portion engaging the female-threaded hole 22 of the connector 2. The rear end of the spring 4 urges the head 50 of the bolt 5.

The front half temple 6 has a square shaped chamber 60 formed in a front portion provided with a front opening and a round hole 61 in an right side and a flat projecting 62 at a left side, an elongate rear portion 63 extending rearward from the chamber 60 and provided with two parallel projections with two aligned threaded holes 630, 630 at the end.

The rear half temple 7 has an ear 70 with a threaded hole 700 at the front end for a screw N1 to connect the rear half temple 7 with the rear end of the front half temple 6 to form a complete temple.

Figure 4:
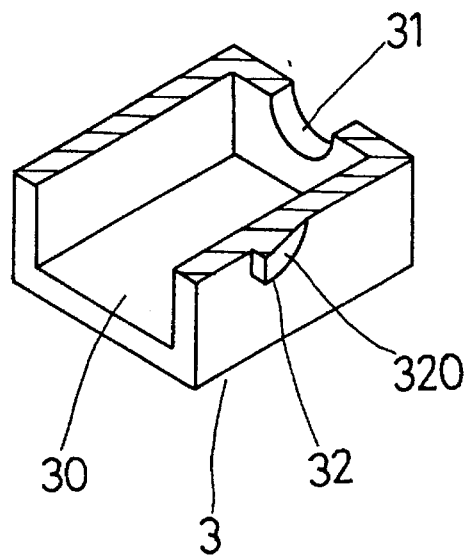
FIG. 4 is a partial cross-sectional view of a socket of the foldable elastic temple for spectacles in the present invention.
Figure 5:
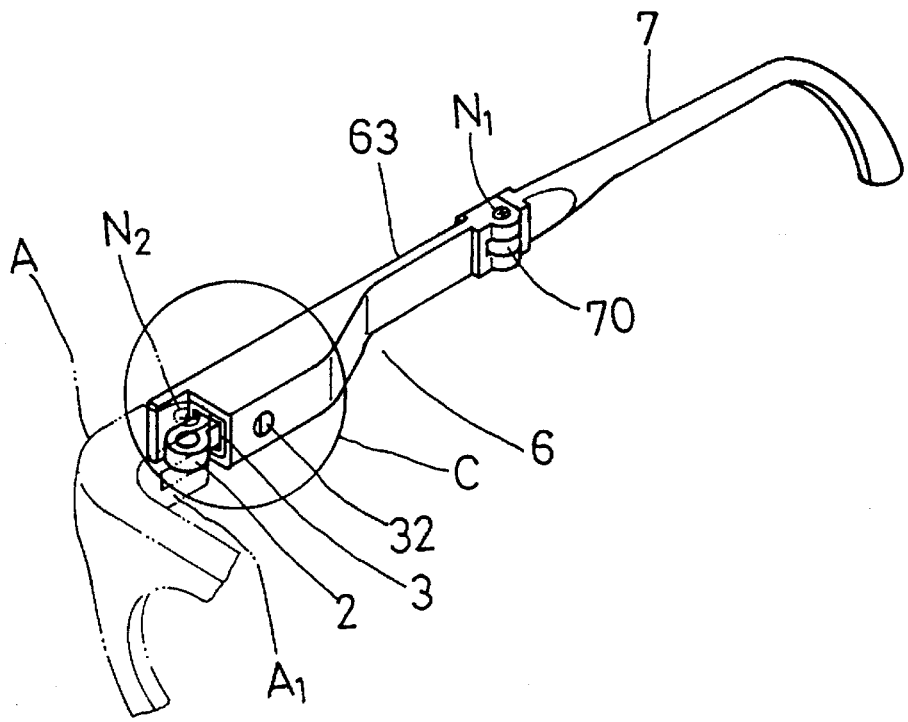
FIG. 5 is a perspective view of the foldable elastic temple for spectacles in the present invention.
Figure 6:
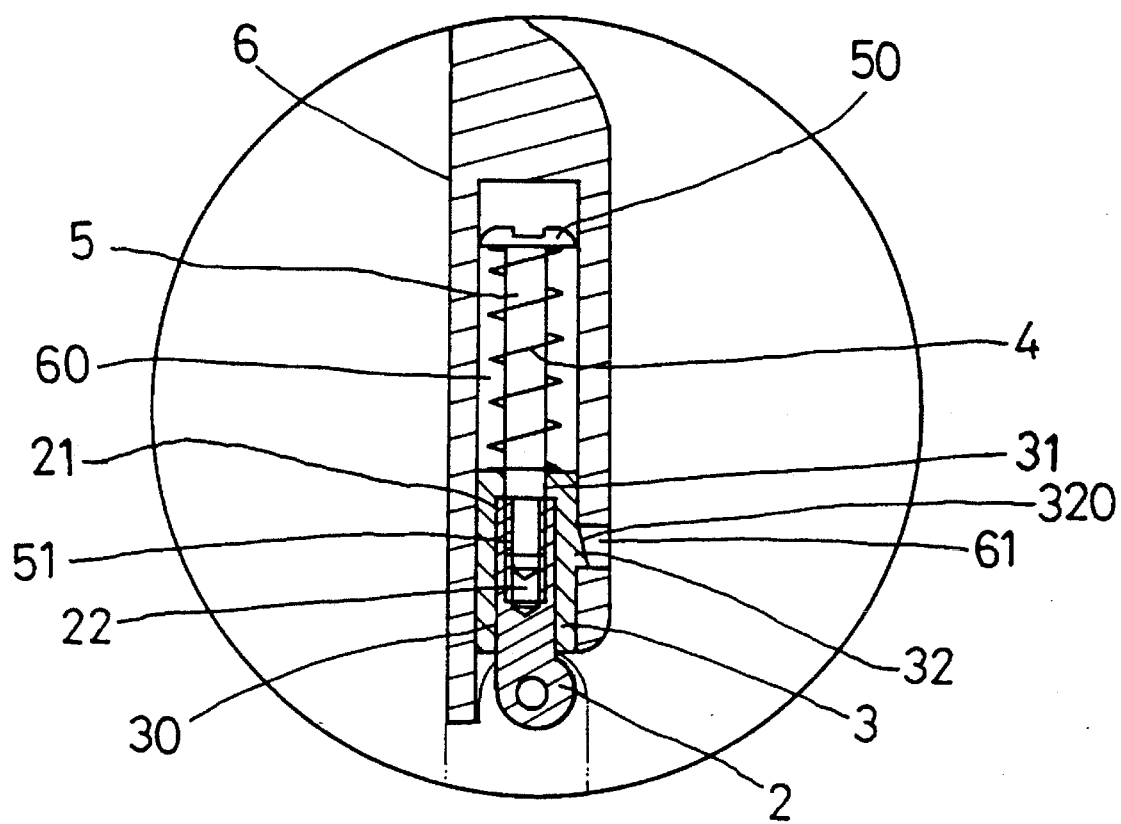
FIG. 6 is a magnified view of the part marked C in FIG. 5.

In assembling, as shown in FIGS. 3, 4 and 5, first, the rear portion 21 of the connector 2 is fitted in the square hole 30 of the socket 3, and the bolt 5 is made to fit through the spring 4 and the round hole 31 and the square hole 30 of the socket 3, with the threaded end portion 51 engaging with the threaded hole 22 of the connector 2 and with the rear end of the spring 4 urging the head 50 of the bolt 5. Next, the elastic assembly of the connector 2, the socket 3, the spring 4 and the bolt 5 are inserted in the chamber 60 of the front half temple 6, and the sidewise projection 32 of the socket 3 advances through the opening of the chamber 60 and fits in the hole 61, securing the socket 3 therein, and consequently the other components, the connector 2, the spring and the bolt 5 also secured in place with the socket 3. Then, the rear half temple 7 is combined with the front half temple 6 with the screw N1 engaging the threaded holes 630, 630 and the threaded hole 700. Lastly, the connector 2 is combined with a lens frame A, with a screw N2 engaging the hole 20 and two projections A1 of the lens frame A.

Figure 7:
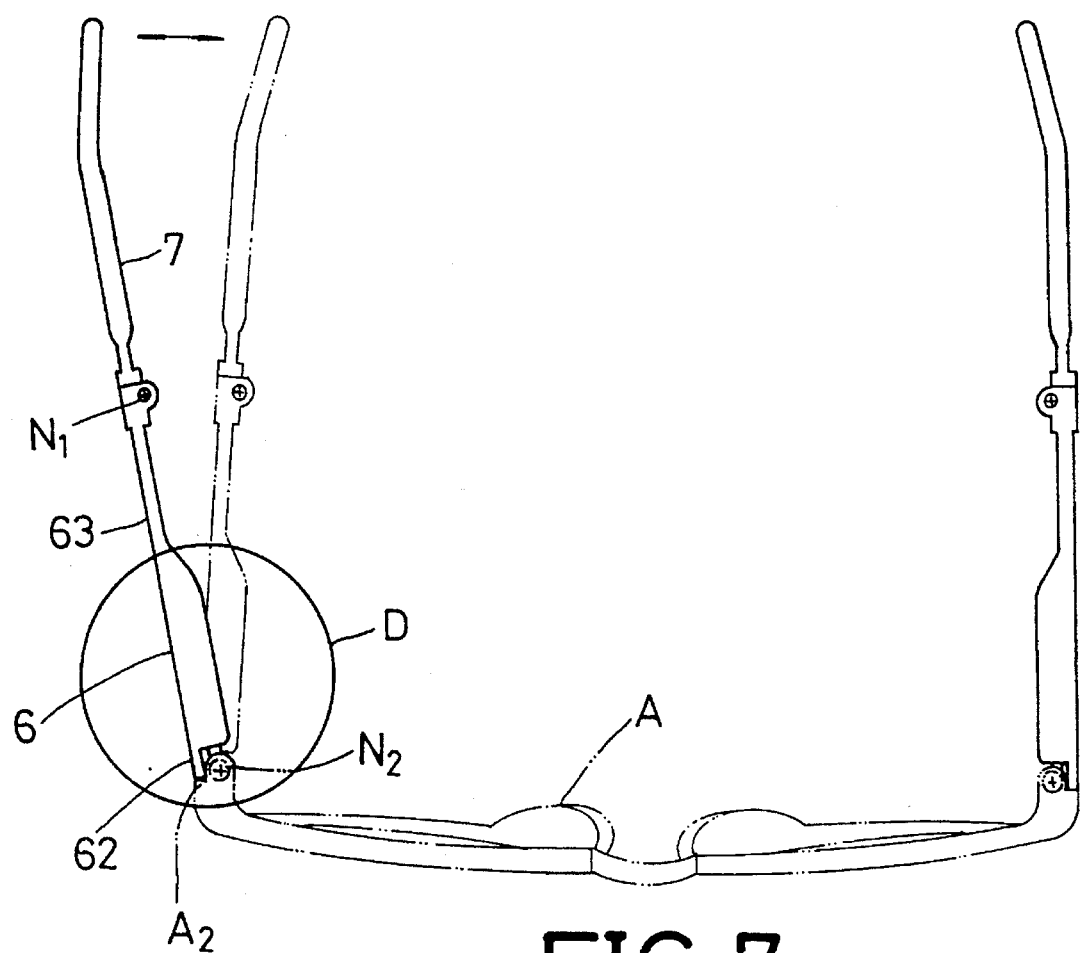
FIG. 7 is a top view of a pair of spectacles having the temples in the present invention.
Figure 8:
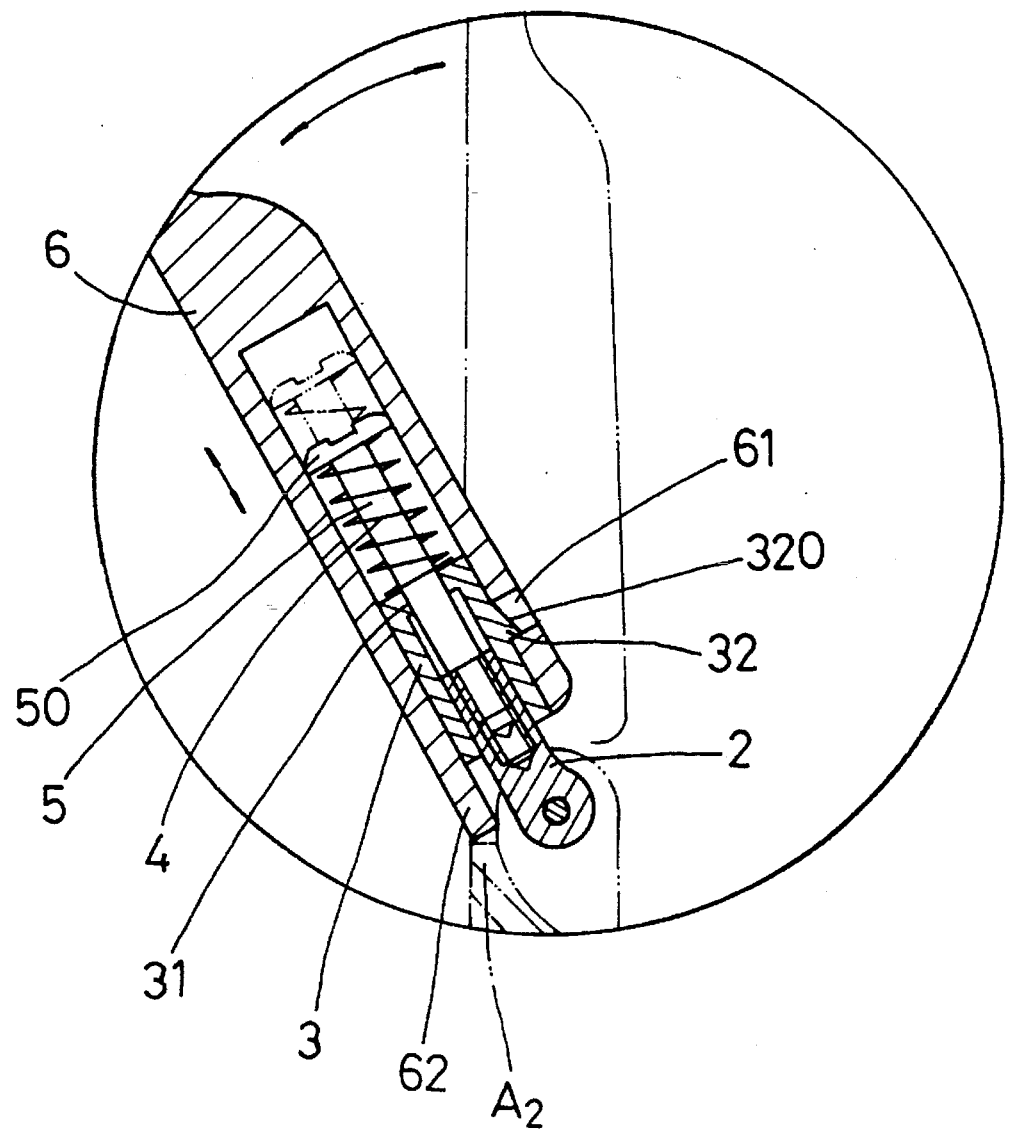
FIG. 8 is a magnified cross-sectional view of the part marked D in FIG. 7.

In wearing, as shown in FIGS. 7 and 8, if the face of a wearer is wider than the inner space of the two temples 6 and 7, a the user only stretches the two temples outward. Then the flat projection 62 of the front half temple 6 urges a stop edge A2 of a lens frame forming a fulcrum, forcing the connector 2 pull the bolt 5 to compress the spring 4 to enable the temples 6 and 7 to extend elastically outward to suit to the width of the face of a user.

Figure 9:
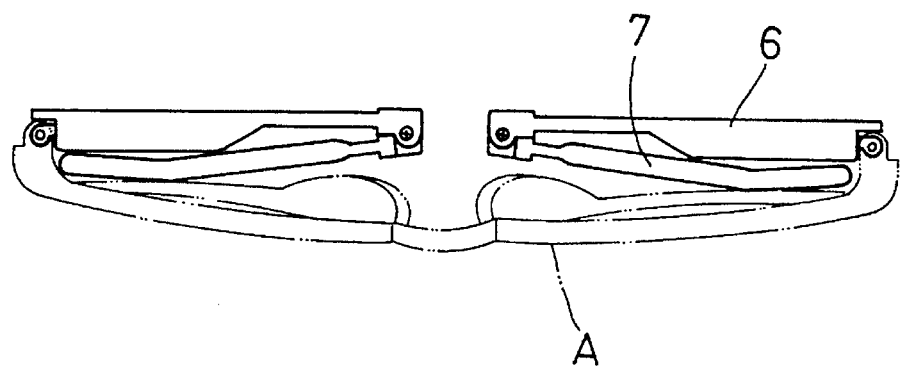
FIG. 9 is a top view of a pair of spectacles having the temples in the present invention, showing the temples folded.

In case the spectacle with these temples is not used, the rear half temples 7, 7 are folded inward to overlie on the front half temples 6, 6 and then they are all together folded on the lens frame A as shown in FIG. 9, becoming a minimized dimension.

From the above description, it may be understood that this temple for spectacles has the following advantages.

1. The socket can be directly fitted in the chamber of the front half temple, secured stably therein without need for adhesive to reduce the cost.

2. The temples can be folded to a minimized dimension.

What is claimed is:

1. A foldable elastic temple for spectacles comprising:

a connector having a front round portion with a lateral female-threaded hole and a rear rectangular portion provided with a lengthwise female-threaded hole;

a socket formed of plastic material with a substantially square cross-sectional configuration, having a square hole in a front portion and a round hole in a rear portion communicating with the square hole for a bolt to pass through, said square hole configured to fit around the rear rectangular portion of the connector, the socket having a side wall with a projection extending outwardly therefrom, the projection having an outer end surface inclined with respect to the side wall:

said bolt having a large head and a male-threaded end to pass through a coil spring, the square hole and the round hole of the socket to engage with the female-threaded hole of the connector so that the connector, the socket, the coil spring and the bolt are assembled as an elastic assembly;

said coil spring fitting substantially around the bolt, having a first end against the head of the bolt and a second end against the rear portion of the socket;

a front half temple having a front lengthwise square chamber with a front opening and a lateral hole in a side wall surrounding the chamber, and a rear elongate flat portion with a distal end;

a rear half temple;

pivot connecting means pivotally connecting the rear half temple to the distal end of the front half temple such that the rear half temple can be pivoted between a first position wherein it is substantially aligned with the front half temple and a second position wherein the rear half temples overlie the front half temples; and, said socket being directly fitted in the chamber of the front half temple, with the projection of said socket engaging the hole in the side wall of said chamber and thus securing said socket in place without need of adhesive.

2. The foldable elastic temple for spectacles as claimed in claim 1, wherein said front half temple further comprises a flat vertical projection at the front end to bear on an end of a lens frame forming a fulcrum so as to allow the front half temple to stretch elastically outward.

* * * * *